(12) United States Patent
Ahmed et al.

(10) Patent No.: US 6,224,843 B1
(45) Date of Patent: May 1, 2001

(54) CARBON DIOXIDE PURIFICATION IN ETHYLENE GLYCOL PLANTS

(75) Inventors: Ijaz Ahmed; Abdulaziz M. Al-Jodai; Abdulmohsin M. Al-Khamees; Shaker A. Al-Saif, all of Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 09/394,737

(22) Filed: Sep. 13, 1999

(51) Int. Cl.[7] .............. C01B 31/20; C01B 7/01; C01B 7/00; B01J 8/00
(52) U.S. Cl. .................. 423/437.1; 423/245.1; 423/481; 423/240 S; 423/240 R
(58) Field of Search .............. 423/245.1, 437.1, 423/481, 240 R, 240 S

(56) References Cited

U.S. PATENT DOCUMENTS

| | | | |
|---|---|---|---|
| 3,989,807 | * 11/1976 | Johnston | 423/502 |
| 4,065,543 | * 12/1977 | Sare et al. | 423/240 |
| 4,255,359 | * 3/1981 | Brunelle | 570/243 |
| 4,925,540 | * 5/1990 | Dhooge | 204/157.42 |
| 5,196,618 | * 3/1993 | Okon et al. | 570/258 |
| 5,531,901 | * 7/1996 | Miyabe et al. | 210/668 |
| 5,643,545 | * 7/1997 | Chen et al. | 423/245.3 |
| 5,895,636 | * 4/1999 | Nguyen et al. | 423/245.1 |

FOREIGN PATENT DOCUMENTS

| | | |
|---|---|---|
| 4305386 | 8/1994 | (DE) . |
| 60086015 | 5/1983 | (JP) . |

* cited by examiner

Primary Examiner—Wayne Langel
Assistant Examiner—Jonas N. Strickland
(74) Attorney, Agent, or Firm—Kramer Levin Naftalis & Frankel LLP

(57) ABSTRACT

A process is provided for production of substantially pure carbon dioxide from a $CO_2$ off-gas stream from an ethylene glycol plant. Water is condensed from an off-gas stream which contains unsaturated hydrocarbons, saturated hydrocarbons, chlorinated hydrocarbons, carbon dioxide and water. The dewatered gas stream is subjected to catalytic oxidation in the presence of excess oxygen whereby the unsaturated hydrocarbons, saturated hydrocarbons and chlorinated hydrocarbons are oxidized producing an oxidation stream containing carbon dioxide, water and hydrochloric acid. The HCl is removed with an absorbent and substantially pure carbon dioxide is collected. The absorbent-contacted stream can be subjected to catalytic deoxidation in the presence of hydrogen to convert unoxidized oxygen introduced in the catalytic oxidation to water.

24 Claims, 2 Drawing Sheets

US 6,224,843 B1

CARBON DIOXIDE PURIFICATION IN ETHYLENE GLYCOL PLANTS

FIELD OF THE INVENTION

The present invention relates to the catalytic purification of carbon dioxide and water condensate contaminated with saturated, unsaturated and chlorinated hydrocarbons from ethylene glycol plants. The invention finds application where $CO_2$ off-gas produced by ethylene glycol plants is to be used in applications requiring high purity $CO_2$, such as in methanol production where it must meet a total allowable chlorides specification of 0.01 ppm, and in carbonated beverages. Additionally, the invention enables recovered waste water to be recycled as Boiler Feed Water (BFW).

Chlorine as HCl can be removed from many vent gases with conventional adsorbents. The removal of organic chlorides, however, has been problematic. A small quantity of $CO_2$ for food grade uses is presently purified by adsorption on different kinds of carbon beds; however, no viable scheme has been available to convert chlorinated hydrocarbons catalytically to HCl followed by adsorption. The present invention relates to a combined process for complete catalytic combustion of saturated, unsaturated and chlorinated hydrocarbons and mono ethylene glycol (MEG) to $CO_2$, $H_2O$ and HCl. The inventive process offers purification of $CO_2$ off-gas produced by ethylene glycol plants by oxidation of saturated, unsaturated and chlorinated hydrocarbons on precious metal based catalyst e.g., platinum, in the presence of excess oxygen; condensation of pure saturating water; removal of HCl on an adsorbent, followed by final removal of excess oxygen by reaction with hydrogen on a commercial Deoxo catalyst. The resulting $CO_2$ stream meets the specifications of food grade, oxyalcohols and methanol industries and the water condensate produced meets BFW requirements.

BACKGROUND OF THE INVENTION

There is no technology currently available for the combined conversion of saturated, unsaturated and chlorinated hydrocarbons as is provided by this invention. However, some work has been done on individual schemes such as oxidation of saturated and unsaturated hydrocarbons alone on precious metal based catalyst, i.e., palladium or platinum. It is also the practice in some ethylene glycol industries to convert hydrocarbons in the carbon dioxide off-gas to $CO_2$ and $H_2O$ followed by carbon dioxide vent to the atmosphere or further purification of a small stream of good grade $CO_2$ by adsorption on carbon. Relevant patents and published applications are discussed below.

German Patent No. DE 4305386 of H. Meye, et al. describes catalyst development in the oxidative purification of saturated hydrocarbon from $CO_2$ with platinum or palladium based catalyst supported on alpha-$Al_2O_3$ with a specific surface area less than $50m^2/g$. The content of platinum is specified to be under 0.2 wt %. The technology described in this patent was developed for food grade purification of $CO_2$ and is different from the present invention because DE 4305386 deals only with development of a catalyst for the removal of organic impurities, especially saturated hydrocarbons from a $CO_2$ stream. The present invention enables the removal of chlorinated and unsaturated hydrocarbons through a combination of oxidation, condensation, adsorption and deoxidation steps to obtain $CO_2$ of high purity.

Japan Patent No. 60086015 of H. J. Ishikawajima describes a method to purify $CO_2$ by physical separation. Since there is no chemical reaction involved in this patent, it is completely different than the present invention.

The present invention is also distinguished from the prior art in that along with oxidation of unsaturated hydrocarbons on a platinum based catalyst, the invention also deals with the catalytic conversion of chlorinated hydrocarbons to HCl, the adsorption of the HCl and the oxidation of MEG to $CO_2$ and $H_2O$ to produce not only carbon dioxide of high purity, but also water which meets the specification of Boiler Feed Water (BFW).

SUMMARY OF THE INVENTION

The present invention provides a complete process for purifying $CO_2$ off-gas from ethylene glycol plants to produce high purity carbon dioxide through catalytic conversion. This high purity carbon dioxide can be used in food grade applications, or in the production of methanol, urea, oxy-alcohols, etc., and the condensate water from the process can be used as boiler feed water (BFW).

Carbon dioxide off-gas from ethylene glycol plants is contaminated with saturated, unsaturated and chlorinated hydrocarbons. Traces of these chlorides, together with ethylene, oxygen and other contaminants, are usually dissolved in the solvent employed in the carbon dioxide removal system. Conventionally, after intermediate flash, the final traces are stripped and discharged with the $CO_2$ off-gas saturated with water at 93° C. Therefore carbon dioxide, containing almost 100% by wt. water, produced by many ethylene glycol plants around the world is presently being vented to the environment. However, some glycol plants condense the $CO_2$ off-gas water prior to oxidation and then carry out individual oxidation of hydrocarbons present in the off-gas in the presence of excess oxygen for environmental purposes. Other glycol plants purify a small stream of $CO_2$ off-gas, through carbon adsorption, to provide food grade $CO_2$ for beverage industries. Water condensate produced during the off-gas cooling is usually sent to a biological treatment system prior to sewage discharge, since it has as much as 2000–3000 ppm of monoethylene glycol (MEG). It is believed that the catalytic elimination of organic chlorides and the purification of wastewater from ethylene glycol plant off-gas is not currently practiced. Therefore, we believe there is a need for a process that could purify this off-gas and its saturating water, so these could be utilized commercially rather than being vented. The degree of purification required depends on the type of end use for this off-gas and associated condensate.

Typical analysis of the off-gas from ethylene glycol plants is as follows:

TABLE 1[a]

| Composition | |
|---|---|
| $O_2$ | 0.24 ppmv |
| Ar | (less than) 0.05 ppmv |
| $CH_4$ | 0.07 ppmv |
| $C_2H_4$ | 0.13 ppmv |
| $C_2H_6$ | (less than) 0.05 ppmv |
| $CO_2$ | 99.46 ppmv |
| EO (ethylene oxide) | (less than) 0.05 ppmv |
| $H_2O$ | Saturated at 93° C. |
| Chlorides | |
| Methyl chloride | <0.1 ppmv |
| Vinyl chloride | <0.1 ppmv |
| Ethyl chloride | 2.5 ppmv |
| Allyl chloride | 0.1 ppmv |
| Ethylene dichloride | <0.1 ppmv |

[a]Units are volume percent on a dry basis.

In accordance with the present invention, the off-gas is first mixed with oxygen in excess of the amount required for complete combustion and heated to approximately 300° C., then passed over a platinum based catalyst for oxidation. In this step, all of the MEG and unsaturated hydrocarbons present in the off-gas are oxidized to $CO_2$ and $H_2O$ and the chlorinated hydrocarbons are converted to HCl. The outlet stream from oxidation is then cooled to about 45° C. to condense substantially all of the water in the stream and the remaining gas passed through a bed of adsorbent, such as aluminum oxide impregnated with sodium, to separate HCl, followed by the catalytic reaction of excess oxygen with hydrogen.

Although some of the individual steps proposed in the present invention, such as oxidation of saturated and unsaturated hydrocarbons with excess oxygen on a platinum based catalyst, have been previously demonstrated, a viable process for the purification of ethylene glycol $CO_2$ off-gas and all the specified trace contaminants in it for the production of high purity $CO_2$ and BFW grade condensate has not previously been demonstrated.

The present invention was tested in a unit installed on-line on an ethylene glycol production unit. Results of this test were continuously analyzed and estimated the total chlorides level in the $CO_2$ off-gas feed to be between 3 to 6 ppm. At the outlet of the $CO_2$ off-gas purification unit, total chlorides analyzed were less than 0.01 ppm. Chlorides in the outlet stream were analyzed to be as follows:

TABLE 2

| Methyl chloride | <0.01 (ppmv) |
|---|---|
| Vinyl chloride | <0.01 (ppmv) |
| Ethyl chloride | <0.01 (ppmv) |
| Allyl chloride | <0.01 (ppmv) |
| Ethylene dichloride | <0.01 (ppmv) |
| Total chlorides | <0.01 (ppmv) |

Carbon dioxide off-gas produced by an ethylene glycol plant is generally saturated with water at 93° C. and carries MEG in the range of 3,000 to 11,000 ppm by wt., depending on plant operation. Cooling this off-gas prior to oxidation results in the condensation of water and MEG, since MEG is high soluble in water. However, removal of MEG from water is very difficult. Consequently, ethylene glycol plants presently find it very difficult to treat this water. With existing technology, the off-gas condensate is treated with expensive biological purification. Average analysis of the untreated off-gas condensate from ethylene glycol plants is as follows:

TABLE 3

| Ethylene oxide | 2.5 ppmw |
|---|---|
| Total Aldehyde | 22 ppmw |
| MEG | 8500 ppmw |
| TOC's | 3800 ppmw |

According to a preferred embodiment of the present invention, instead of condensing the water prior to oxidation, MEG is first oxidized along with other hydrocarbons in an oxidation reactor. Water saturating the $CO_2$ off-gas is condensed from the off-gas only after this oxidation. The resulting condensate is of high purity, and satisfies the specifications for potable water or BFW.

DETAILED DESCRIPTION OF THE INVENTION

Ethylene oxide is a precursor for ethylene glycol production. In ethylene oxide plants, small quantities of organic chlorides are injected for the control of catalyst activity. Traces of these chlorides together with ethylene, oxygen and other waste gases appear in the $CO_2$ off-gas from ethylene glycol plants. The average value of these contaminants in the $CO_2$ off-gas on a dry basis is as follows;

TABLE 4

| Methane | 650 ppmv |
|---|---|
| Ethane | 2–3 ppmv |
| Ethylene | 1250 ppmv |
| MEG | 6000 ppmv |
| Chlorinated hydrocarbons | 1 to 5 ppmv |

If the carbon dioxide off-gas stream is to be used in food grade products or in the production of methanol, urea, ethyl hexanol or many other useful products, then organic chlorides and hydrocarbons must be removed. The removal of organic chlorides is difficult and heretofore no proven scheme for this removal has been available.

Surprisingly, the process of the present invention for the purification of ethylene glycol plant $CO_2$ off-gas meets the requirements for highly purified $CO_2$ and water. The process was demonstrated in an on-line test unit for 2.5 $NM^3/HR$ $CO^2$ off-gas capacity at the site of an ethylene glycol plant.

For food-grade $CO_2$, hydrocarbons are to be removed to below 5 ppmv. This specification is also applied to methane which is very unreactive, even more unreactive than the organic chlorides contained in ethylene glycol off-gas. According to the present invention, these hydrocarbons are removed by catalytic combustion with oxygen at a temperature between 300° C. and 450° C. to form $CO_2$ and $H_2O$. Representative catalysts which can be used for this oxidation step include, e.g., palladium and platinum. The amount of excess oxygen required and combustion temperature depend on the type and extent of hydrocarbons to be removed. In the described on-line test, it was found that about 0.05% to about 1.5% excess oxygen at a combustion temperature maximum of 450° C. provided excellent results.

The on-line test unit purified $CO_2$ off-gas, removing traces of chlorinated organic compounds and other hydrocarbons by oxidizing them in a combustion chamber into $CO_2$, $H_2O$ and HCl, followed by adsorption of HCl on an adsorbent.

Carbon dioxide off-gas from an ethylene glycol plant is normally obtained at low pressure and contains nearly 100% by wt. of water vapor. In one embodiment of the inventive process, this off-gas is compressed, then heated and passed over noble metal oxidation catalyst for catalytic conversion of saturated and unsaturated hydrocarbon and chlorinated hydrocarbons in presence of excess oxygen. Remaining oxygen is then deoxidized by reaction with hydrogen to complete the purification of the $CO_2$ off-gas.

EXAMPLE 1

Figure 1:
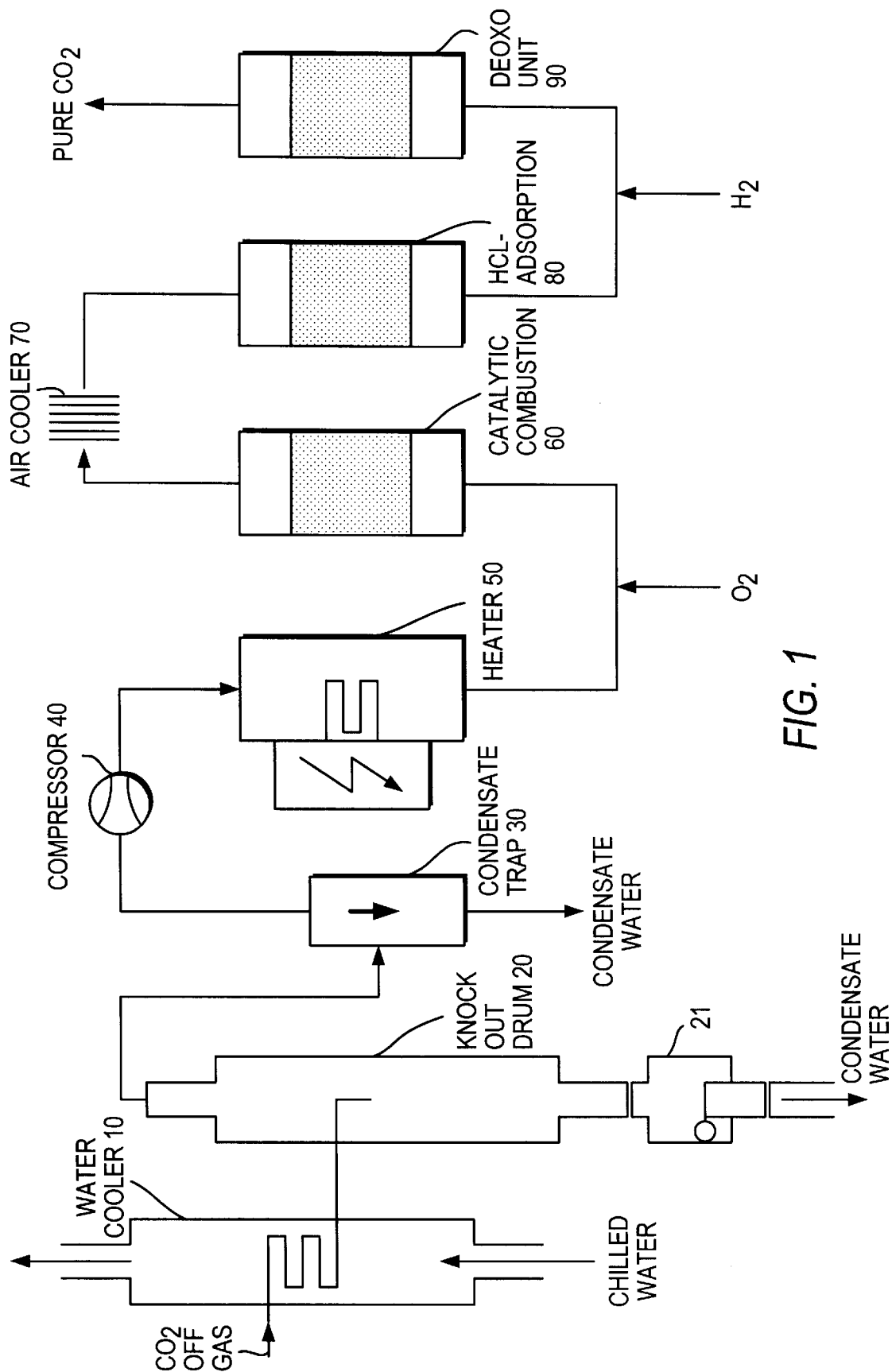
FIG. 1 is a block diagram of the major steps in a purification process according to the present invention for high purity $CO_2$.

Details of the process scheme for high purity $CO_2$ are indicated in the flow chart shown in FIG. 1.

The $CO_2$ off-gas from an ethylene glycol plant supplied at a temperature of 93° C. and ambient pressure and having the composition detailed in Table 1 is conveyed into heat exchanger 10 where it is cooled to 45° C. with chilled water at 16° C. The condensate water formed is separated in a knock-out drum 20. The pressure in knock-out drum 20 is lower than the ambient pressure, so condensate water discharge unit 21 is employed to prevent the entrance of air into the system. Gas exiting knock-out drum 20 is passed through condensate trap 30 to remove entrained condensate and then compressed in compressor 40. The suction pressure of compressor 40 is approximately 0.8 bar. A valve (not shown) is provided to adjust the flow rate. Compressor 40 has an exit pressure of about 2.3 bar.

Compressed $CO_2$ off-gas emerging from compressor 40 is conveyed to heater 50 and heated to 400° C. before being passed over catalyst in combustion reactor 60 for oxidation. A controlled amount of oxygen for the oxidation was introduced into the heated gas upstream of reactor 60. The amount of oxygen was maintained at 1.5 vol % The amount of oxygen can be controlled to maintain the oxygen content in the range of 0.8 to 1.5 vol %.

Combustion reactor 60 contains a Pt-based catalyst on $Al_2O_3$-carrier type. The catalyst employed in the test unit was 7718 R LEUNA purchased from Linde AG, Germany. Reactor 60 oxidizes the hydrocarbons and chlorinated hydrocarbons to $CO_2$, $H_2O$ and HCl. The process stream leaves reactor 60 at an exit temperature of approximately 425° C., and is conveyed to air cooler 70 which lowers the temperature of the process stream to about 65° C., i.e., about 30° C. above dew point, to prevent condensation in adsorber 80 which removes hydrochloric acid formed in reactor 60. Absorber 80 utilized alumina impregnated with sodium as an absorbent (LA-5711, Linde AG, Germany).

Exit gas from adsorber 80 is routed to deoxo-reactor 90 containing catalyst 7748 R in stead of 7718R LEUNA, which is the platinum based catalyst described above with respect to reactor 60, to convert the remaining oxygen in the exit gas to water. Hydrogen is added to the gas flow prior entering to deoxo-reactor 90. The deoxo-reactor is operated with an exit temperature of about 230° C. and an exit pressure of at least 1.2 bara. Purified $CO_2$ off gas emerged from deoxo-reactor 90.

The described on-line tests achieved surprisingly good $CO_2$ purity of 0.003 ppm of chlorides and below one ppm of ethylene respectively.

Samples from the catalytic combustion reactor 60 and from the adsorber 80 indicated no slippage of chlorides because all the chlorides were oxidized. The chlorides levels at the outlet of reactor 60 were measured to be less than 0.003 ppm, which is below the 0.01 ppm feed specification for the catalyst of a methanol reactor.

Average operating results for eight months operation of the described test are summarized below in Table-6.

TABLE 6

| | | Feed Gas | Gas aft Comb. | Gas aft Adsorb. | Purified $Co_2$ |
|---|---|---|---|---|---|
| $CH_4$ | Vppm | 550–700 | <1 | <1 | <1 |
| $C_2H_4$ | Vppm | 1250 | <1 | <1 | <1 |
| $C_2H_6$ | Vppm | 2–4 | <1 | <1 | <1 |
| $C_3$ | Vppm | 5 | <1 | <1 | <1 |
| EO | Vppm | 6–8 | <1 | <1 | <1 |
| Acet. | Vppm | 2–3 | <1 | <1 | <1 |
| MC | Vppm | <0.05 | <0.01 | <0.01 | <0.01 |
| VC | Vppm | <0.05 | <0.01 | <0.01 | <0.01 |
| EC | Vppm | <0.05 | <0.01 | <0.01 | <0.01 |

TABLE 6-continued

| | | Feed Gas | Gas aft Comb. | Gas aft Adsorb. | Purified $Co_2$ |
|---|---|---|---|---|---|
| AC | Vppm | 0.01–3.0 | <0.01 | <0.01 | <0.01 |
| EDC | Vppm | <0.05 | <0.01 | <0.01 | <0.01 |
| TCL | Vppm | 0.1–0.2 | Max. 0.03 | max. 0.003 | <0.003 |
| HCl | Vppm | — | 0.03 | 0.003 | — |

EXAMPLE 2

To demonstrate the operation of the process scheme of FIG. 1 at different reactor 60 conditions, the process of Example 1 was repeated but with reactor 60 being operated at a combustion temperature between 280° C.–300° C. and with 0.05% excess oxygen input. At these reaction conditions analytical test results indicated that all the low reactive hydrocarbons were oxidized to below 1 ppm and chlorinated hydrocarbons were eliminated by conversion to hydrochloric acid well below the target level of 0.01 ppm. However, the saturated hydrocarbons such as methane and ethane remained on the average level of 600 and 3 ppm respectively. To eliminate the low reactive hydrocarbons the temperature of the feed gas to reactor 60 had to be increased to 400° C. and the excess oxygen concentration in the feed to reactor 60 increased to about 2%.

It was concluded that there is only a small requirement for deoxo-reactor 90 in the purification system as the excess oxygen in reactor 60 exit gas was minimal. Also because the HCl from reactor 60 was below 0.01 ppm, the adsorption step is not required for certain purified $CO_2$ end uses.

EXAMPLE 3

Figure 2:
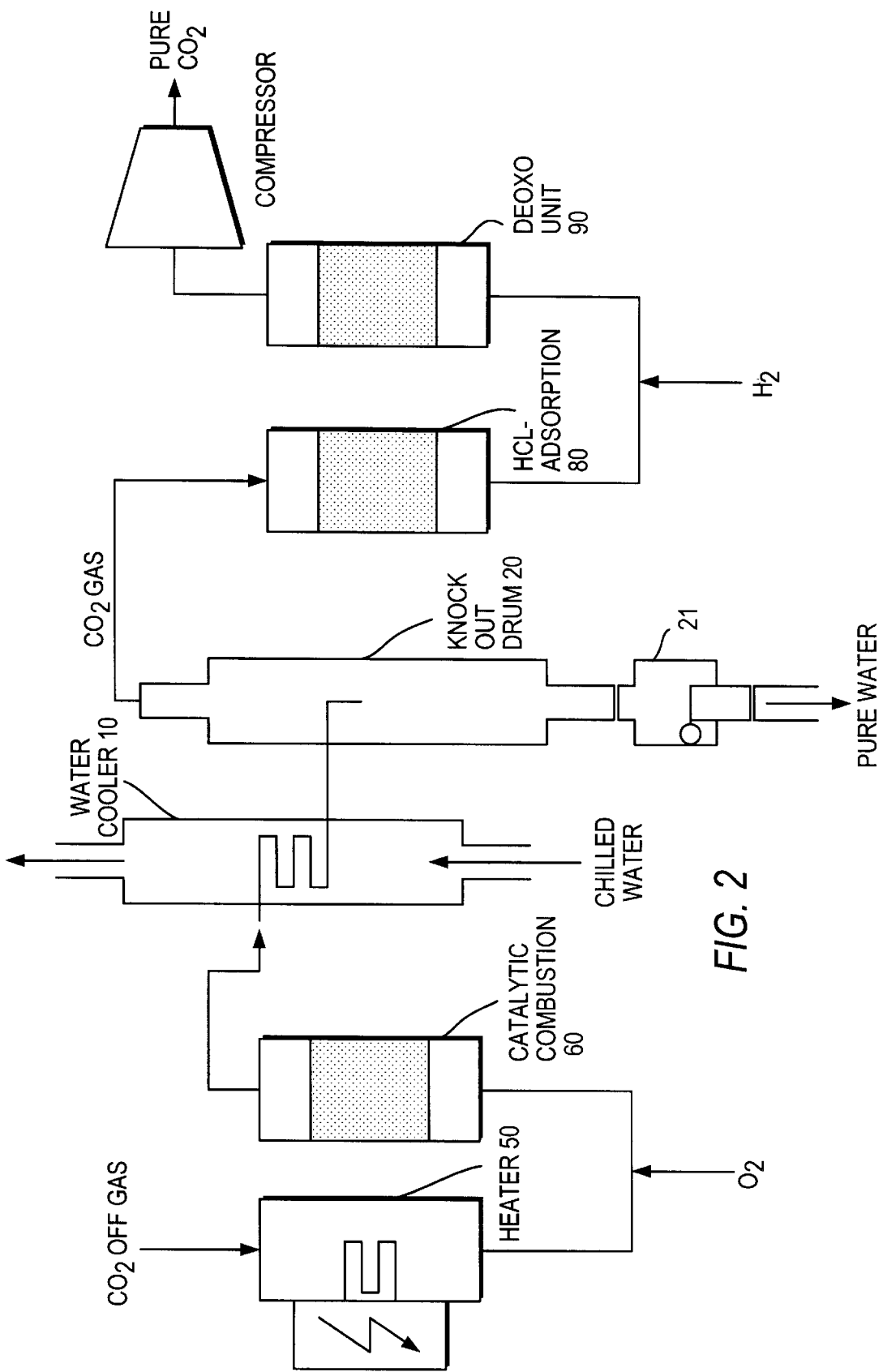
FIG. 2 is a block diagram of the major steps in a purification process according to the present invention for high purity $CO_2$ and high purity water condensate.

Oxidizing MEG along with hydrocarbons in reactor 60 by raising the inlet temperature of the feed stream was also investigated. Instead of condensing water upstream of reactor 60, the $CO_2$ off-gas was cooled and condensed at the outlet of reactor 60. It was found that MEG was oxidized and did not appear in the condensed water. This scheme is indicated in FIG.-2 where like units bear the same numbers as in FIG.-1.

It was demonstrated that MEG could be economically oxidized in reactor 60, along with the unsaturated hydrocarbons and chlorinated compounds to produce ultra pure water at operating conditions corresponding to those of Example 1. In this scheme, $CO_2$ off-gas at 2.4 bar is heated to 400° C. and dosed to 1.5% $O_2$ prior to being fed to Catalytic Combustion Reactor 60. Reactor 60 outlet gas is cooled to 45° C. and its entrained condensate is remove prior to the gas being feed to HCL-Absorber 80. Deoxo-reactor 90 is operated with an exit temperature of about 230° C. and an exit pressure of at least 1.2 bar. Ultra pure water quality produced from this embodiment of the invention is detailed in Table-7. The same results were achieved when the $CO_2$ off-gas was heated to 300° C. and dosed to 1.5% $O_2$ prior to being fed to Reactor 60.

TABLE 7

| | Unit | Reactor 60 | After Reactor 60 |
|---|---|---|---|
| Ethylene Oxide | wtppm | 2.5 | Nil |
| Total Aldehyde | wtppm | 22 | Nil |
| MEG | wtppm | 8500 | Nil |
| TOC | wtppm | 3800 | Nil |

What is claimed is:

1. A process for production of substantially pure carbon dioxide from a $CO_2$ off-gas stream from an ethylene glycol plant comprising unsaturated hydrocarbons, saturated hydrocarbons, chlorinated hydrocarbons, carbon dioxide and water, said process comprising:
- condensing out water initially present in the $CO_2$ off-gas stream to produce a dewatered off-gas stream;
- subjecting the dewatered off-gas stream to catalytic oxidation in the presence of excess oxygen whereby said unsaturated hydrocarbons, saturated hydrocarbons and chlorinated hydrocarbons are oxidized producing an oxidation product stream comprising carbon dioxide, water and hydrochloric acid;
- contacting the oxidation product stream with HCl adsorbent to adsorb hydrochloric acid producing an adsorbent-contacted stream; and
- collecting substantially pure carbon dioxide from the absorbent-contacted stream.

2. The process of claim 1 wherein the absorbent-contacted stream is subjected to catalytic deoxidation in the presence of hydrogen to convert unoxidized oxygen introduced in the catalytic oxidation step to water.

3. The process of claim 1 wherein the waste gas stream comprises one or more members of the group consisting of methyl chloride, vinyl chloride, ethyl chloride, allyl chloride, ethylene dichloride, ethylene oxide, aldehydes, monoethylene glycol, methane, ethane and ethylene.

4. The process of claim 1 wherein the catalytic oxidation is carried out in the presence of a noble metal oxidation catalyst.

5. The process of claim 4 wherein the oxidation catalyst comprises noble metal on a support.

6. The process of claim 5 wherein the noble metal comprises platinum.

7. The process of claim 6 wherein the support comprises alumina.

8. The process of claim 7 wherein the dewatered off-gas stream is subjected to catalytic oxidation at a feed temperature of at least 300° C.

9. The process of claim 8, wherein the dewatered off-gas stream is subjected to catalytic oxidation at a feed pressure of at least 1.5 bar.

10. The process of claim 9, wherein the dewatered off-gas stream is subjected to catalytic oxidation at a feed temperature of at least 425° C.

11. The process of claim 10, wherein the dewatered off-gas stream is subjected to catalytic oxidation at a feed temperature of about 450° C.

12. The process of claim 1, wherein the HCl absorbent comprises aluminum oxide impregnated with sodium.

13. A process for production of substantially pure carbon dioxide and substantially pure condensate water from a $CO_2$ off-gas stream from a ethylene glycol plant, comprising unsaturated hydrocarbons, saturated hydrocarbons, chlorinated hydrocarbons, ethylene glycol, carbon dioxide and water, said process comprising:
- subjecting the $CO_2$ off-gas stream to catalytic oxidation in the presence of excess oxygen whereby said unsaturated hydrocarbons, saturated hydrocarbons, chlorinated hydrocarbons and ethylene glycol are oxidized producing an oxidation product stream comprising carbon dioxide, water and hydrochloric acid;
- condensing water from the oxidation product stream to produce substantially pure water and a dewatered off-gas stream;
- contacting the dewatered off-gas stream with HCl absorbent to absorb hydrochloric acid producing an absorbent-contacted stream; and
- collecting substantially pure carbon dioxide from the absorbent-contacted stream.

14. The process of claim 13 wherein the absorbent-contacted stream is subjected to catalytic deoxidation in the presence of hydrogen to convert unoxidized oxygen introduced in the catalytic oxidation step to water.

15. The process of claim 13 wherein the waste gas stream comprises one more members of the group consisting of methyl chloride, vinyl chloride, ethyl chloride, allyl chloride, ethylene dichloride, ethylene oxide, aldehydes, monoethylene glycol, methane, ethane and ethylene.

16. The process of claim 13 wherein the catalytic oxidation is carried out in the presence of a noble metal oxidation catalyst.

17. The process of claim 16 wherein the oxidation catalyst comprises noble metal on a support.

18. The process of claim 17 wherein the noble metal comprises platinum.

19. The process of claim 18 wherein the support comprises alumina.

20. The process of claim 19 wherein the dewatered off-gas stream is subjected to catalytic oxidation at a feed temperature of at least 300° C.

21. The process of claim 20, wherein the dewatered off-gas stream is subjected to catalytic oxidation at a feed pressure of at least 1.5 bar.

22. The process of claim 21, wherein the dewatered off-gas stream is subjected to catalytic oxidation at a feed temperature of at least 425° C.

23. The process of claim 22, wherein the dewatered off-gas stream is subjected to catalytic oxidation at a feed temperature of about 450° C.

24. The process of claim 13, wherein the absorbent comprises aluminum oxide impregnated with sodium.

* * * * *